(12) United States Patent
Cena

(10) Patent No.: US 6,766,326 B1
(45) Date of Patent: Jul. 20, 2004

(54) UNIVERSAL STORAGE FOR DYNAMIC DATABASES

(76) Inventor: Resty M Cena, 115 William Bell Dr., Leduc AB (CA), T9E 6P8

( * ) Notice: Subject to any disclaimer, the term of this patent is extended or adjusted under 35 U.S.C. 154(b) by 75 days.

(21) Appl. No.: 09/624,016

(22) Filed: Jul. 24, 2000

(51) Int. Cl.$^7$ .............................................. G06F 17/00
(52) U.S. Cl. ....................... 707/101; 707/102; 707/103
(58) Field of Search ................................. 707/100, 101, 707/102, 103, 104.1, 200, 201, 202, 203; 709/217, 218, 219, 220, 221, 222; 705/7, 8, 37, 51

(56) References Cited

U.S. PATENT DOCUMENTS

| | | | | |
|---|---|---|---|---|
| 5,295,261 A | * | 3/1994 | Simonetti ....................... | 707/2 |
| 5,303,367 A | * | 4/1994 | Leenstra, Sr. et al. ...... | 707/102 |
| 5,721,911 A | * | 2/1998 | Ha et al. .................... | 707/100 |
| 5,873,087 A | * | 2/1999 | Brosda et al. .............. | 707/100 |
| 5,884,311 A | * | 3/1999 | Blattmann-Bleile et al. ... | 707/1 |
| 5,970,496 A | * | 10/1999 | Katzenberger .............. | 707/102 |
| 5,974,407 A | * | 10/1999 | Sacks ........................... | 707/1 |
| 5,978,811 A | * | 11/1999 | Smiley .......................... | 705/1 |
| 6,023,699 A | * | 2/2000 | Knoblock et al. ............ | 707/10 |
| 6,044,373 A | * | 3/2000 | Gladney et al. .............. | 707/10 |
| 6,185,601 B1 | * | 2/2001 | Wolff ......................... | 709/105 |

OTHER PUBLICATIONS

Data Model Patterns: Conventions of Thought, David C. Hay, Dorset House, New York, 1995.*

* cited by examiner

*Primary Examiner*—Shahid Alam
*Assistant Examiner*—Isaac Woo

(57) ABSTRACT

This invention pertains in general to data management, and in particular to a system and method of storing in one relational database consisting of at most five physical tables, data from an arbitrary number of arbitrarily designed relational schemas. The addition and deletion of schemas and the modifications of existing schemas do not affect the structure of the database itself. The present invention is an ideal storage system for data aggregations with a quickly evolving data model (for example, moveable and customizable components within moveable and customizable components), data aggregations with practically unbounded sets of entities and attributes (for example, intelligence data about customers, contacts, and competitors), and data aggregations that do not assume prior knowledge of the data schema (for example, self-describing data aggregations like XML documents).

3 Claims, No Drawings

US 6,766,326 B1

UNIVERSAL STORAGE FOR DYNAMIC DATABASES

CROSS-REFERENCE TO RELATED APPLICATIONS

| | | | |
|---|---|---|---|
| 5295261 | Mar., 1994 | Simonetti | 707/2 |
| 5303367 | Apr., 1994 | Leenstra, et al. | 707/100 |
| 5721911 | Feb., 1998 | Ha, et al. | 707/100 |
| 5873087 | Feb., 1999 | Brosda, et al. | 707/100 |
| 5884311 | Mar., 1999 | Blattmann-Bleile, et al. | 707/10 |
| 5970496 | Oct., 1999 | Katzenberger | 707/102 |
| 5974407 | Oct., 1999 | Sacks | 707/2 |
| 5978811 | Nov., 1999 | Smiley | 707/103 |
| 6023699 | Feb., 2000 | Knoblock, et al. | 707/10 |
| 6044373 | Mar., 2000 | Gladney et al. | 707/10 |
| 6185601 | Feb., 2001 | Wolff | 709/105 |

OTHER REFERENCE

"Data Model Patterns: Conventions of Thoughts," David C. Hay, Dorset House, New York.

STATEMENT REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

This invention pertains in general to data management, and in particular to a system and method of storing in one relational database with a fixed number of physical tables, data from an arbitrary number of arbitrarily designed relational schemas in such a manner that the structure of the database is unaffected by any changes in the structures of the schemas.

2. General Background and Prior Art

Conventional implementations of relational data models map logical entities to physical tables with fixed structures. A major disadvantage of such implementations is the isomorphism of logical constructs and physical objects. Changes in the logical data model, such as the addition and deletion of entities and attributes, require a restructuring of the database. Systems of storage have been devised that attempt to reduce the effects of schema evolution on the storage system. One strategy, to which the present invention belongs, is abstraction, a technique that treats metadata (such as table names like "Employees" and column names like "Payroll_Number") as data that can be manipulated at runtime. A review of prior art shows that current inventions using metadata abstraction are only partially independent from the architecture of the logical model; with physical tables still defined in terms of business- or content-specific constructs. Another shortcoming of prior art is the failure to address matters pertaining to data integrity policies, such as primary key, foreign key, unique key and the like as well as data access and security policies, which are of paramount importance in transaction-oriented commercial applications.

3. Statement of Need

Network and hierarchical data aggregations—such as parts of a complex machinery like an aircraft, network of telecommunication devices, components of networked computer systems, corporate assets—typically are characterized by a high degree of volatility. Component attributes can and do change. Likewise, the relationships among components also undergo many changes. Components are attached and detached from other components, or moved around from one location to another. New components are introduced, old ones retired. Such events typically require database restructure. Other data aggregations have sets of record types that for practical purposes may be considered unbounded, for example, intelligence data about contacts, customers, and competitions. One cannot identify at design time the full set of entities and attributes that will be of interest to users of such systems. When implemented using physical tables to represent entities, such systems require too much maintenance effort to catch up to user needs. Soon users are using unstructured multi-subject fields like "Notes," "Comments," or "Remarks" to store otherwise structured data.

Of immediate interest is the problem posed by the need for a better way to store the data contained in structured documents, for example, XML documents. With the increasing use of XML documents as the preferred container of structured data for transmission in electronic transactions, the need has become apparent for a database system that is fully independent of the structural shapes of logical data models. While XML data inside XML documents can be processed, businesses still prefer to store structured data in relational tables for storage efficiency and ease of manipulation. Storing XML data in relational tables requires prior creation of matching tables. This can be impractical. An XML document contains its own logical data model (as specified in its data type definition or schema) that describes the elements of the documents and their relationships. The data model may change any number of times in the lifetime of the document. Processing an XML document that suddenly has a modified schema, under a system that stores classes of facts in separate fixed tables, requires database restructure. The essence of self-describing documents is the removal of the need for a preliminary handshake between document publisher and consumer. With self-describing documents, the expectation is that the consumer can comprehend the structure of the document by reading its schema. This convention permits unannounced modifications to the document data model.

What is needed is a dynamic storage system whose physical structure is independent of the architecture of the schemas that underlie the stored databases such that changes in the schemas do not require changes in the structure of the storage system. The present invention satisfies this need.

SUMMARY OF THE INVENTION

This invention is a method of storing data values of arbitrarily defined record types in a single fact table and using a system of indexes to retrieve record instances. The invention provides a single database storage system for any number of databases and one whose physical configuration is unaffected by changes to the architecture of the underlying data models. This storage system is referred to hereinafter as "Universal Database Storage System" or "UDSS".

To achieve this objective, the UDSS schema operates at the meta-metadata level with constructs like "Elements", "Entities", "(Entity) Composition", "(Entity) Occurrences", and "Data Values", and treats metadata such as "Employees" and "Employee Name" as data, alongside with data values like "John Jones", "Jun. 1, 2000", and the like. Operating at this abstract level makes it possible to limit the number of physical tables to at most five, as follows:

Four structural tables:

- The Elements table, which contains the inventory of elements metadata for all the implemented data models, consisting of two element types: simple elements (also referred to as "fields") and complex elements (also referred to as "record types"), and attributes that apply to both or either of the element types;
- The Entities table, which contains record types metadata for all the implemented data models, and attributes global to instances of record types (this table is required only if at least one entity can have more than one instance, for example, if entity versioning is required);
- The Composition table, which specifies the elements that compose record types for all the implemented data models, and specifies attributes specific to instances of record types;
- The Occurrences table, which contains information about occurrences (equivalent to the rows of a conventional relational table) of instances of record types for all the implemented data models; and One fact table:

- The Data Values table, which contains the values of the fields of occurrences of instances of record types for all the implemented data models.

As mentioned, an element may be a record type or a field type. A record type may consist of fields alone, or of other record types alone, or a combination of fields and record types. Each record type has a corresponding record in the Entities table. Each entity or record type in the Entities table has associated with it a number of elements, and this element-of relationship is specified in the Composition table. Each record in the Occurrences table contains information about specific occurrences of an instance of a record type. The field values of an occurrence of an instance of a record type are stored individually as rows in the Data Values table.

Each row in the Data Values table consists of a data value field, an Occurrences key value field that relates the field to a unique record in the Occurrences table, and a Composition key value that relates the field to a unique row in the Composition table. These two key values make possible the retrieval of structural information relating to the field and the record type itself as contained in the Composition, Entities, and Elements tables.

In essence, UDSS implements a relational database as a system of indexes to a single fact table. With a system of indexes rather than a set of physical tables, the addition, deletion, and modification of tables do not require physical restructuring of the database. A new application data table is added by simply defining it as a record type in the UDSS Elements definition table. The new data table's fields are entered in the UDSS Elements definition table as simple or complex elements. The structure of the data table is then defined in the Composition table. Deletion of a data table simply requires deletion of the appropriate rows in the UDSS tables. Similar processes are involved in adding or deleting fields to a data table.

UDSS is an ideal storage system for structured data contained in self-describing structured documents like XML documents. In a non-UDSS type of storage, to store XML documents in permanent storage to support extensive data manipulation processes, a common practice is to fit data into physical tables. This presupposes the existence of appropriately defined tables. Thus, new document types cannot be processed until tables are first created. Similarly changes in the schema of previously recognized document types require database changes before the document can be processed. A UDSS-based storage is impermeable to such structural changes. The XML document schema directly parses into the Elements, Entities, and Composition tables. The body of the XML document supplies information on occurrences of record types, and provides the data values.

UDSS has conceptual similarities to a multi-dimensional database (MDDB). Both have a fact table. Both have pointer tables whose function is to provide index values to appropriate rows in the fact table (though this is only one of the functions of the UDSS structural tables). A major difference is in the nature of the physical storage system. The dimension tables of an MDDB are separate tables, and different fact types are stored in different fact tables. As more dimensions and fact types are brought into play in an MDDB, the physical system increases in complexity. A simple star schema grows into a constellation of star schemas. In contrast, the number of UDSS tables remains fixed at five no matter how many fact sets are added to the database. Indeed, an MDDB can be converted into a UDSS by folding the dimension tables into the four structural tables of a UDSS, and the fact tables into the single Data Values table.

BRIEF DESCRIPTION OF THE SEVERAL VIEWS OF THE DRAWING

N/A

DETAILED DESCRIPTION OF THE INVENTION

The UDSS data model itself is implemented as a relational database. Following are definitions of UDSS tables (expressed in pseudo-schema terms). Fields may be added to the tables to control or enrich the behavior of the applications using the tables.

1. Definitions of the UDSS Tables

The Elements table has the following minimal structure:

| ELEMENTS | |
|---|---|
| element_key | number constraint pk_elements primary key |
| element_type | varchar2 (1) check in ('R', 'F') default 'F' |
| element_name | varchar2 (30) constraint uq_ed_1 unique |
| element_data_type | varchar2 (1) check in ('N', 'C', 'D') default 'C' |
| element_data_size | number not null if element_type in ('F', 'A') |
| element_decimal_nbr | number not null if element_data_type = 'N' |

The Elements table contains the inventory of entities (=tables) and attributes (=fields or columns) of a traditional relational schema. The field element_type may be Record or Field. element_data_type may be Numeric, Character, or Date. Other fields may be added to enrich the application model, for example, fields relating to ownership, creation, modification, display, access, and security. Security and data integrity policy fields may be added that point to program code that implements security and data integrity policies that relate generally to the element defined. The program code is invoked as part of data manipulation activities.

Each element of type record has a record entry in the Entities table, and is further defined minimally, thus:

| ENTITIES | |
|---|---|
| entity_key | number constraint pk_entities primary key |
| element_key | number constraint fk_entities_1 reference Elements |
| version_nbr | number |
| table constraint uq_entities_1 unique (element_key, version_nbr) | |
| table constraint uq_entities_2 unique detail (field1, . . . , fieldn; field1, . . . , fieldn; . . . ) | |

The Entities table stores data that represent different instances of an Entity, for example, successive versions of entity definitions. (If entity versioning is not required, information about entities can be entered in the Elements table. The entity Composition table will then be driven by the Elements table, with an element of record type serving as foreign key.) The constraint . . . unique detail clause is used to indicate combinations of fields (belonging to the entity) whose combined values must be unique within an occurrence of a particular instance of the entity. Other fields may be added to enrich the application model, for example, fields relating to ownership, creation, modification, access, security, and display. Security and data integrity policy fields may be added that point to program code that implements security and data integrity policies that relate specifically to the entity defined. The program code is invoked as part of data manipulation activities.

The minimal composition of an entity is specified in the Composition table.

| COMPOSITION | |
|---|---|
| composition_key | number constraint pk_composition primary key |
| entity_key | number constrain fk_composition_1 references Entity not null |
| element_key | number constraint fk_composition_2 references Element not null |
| primary_key_yn | varchar2(1) check in ('Y', 'N') default 'N' null if element type is record type |
| unique_yn | varchar2(1) check in ('Y', 'N') null if element type is record type |
| reference_element_key | number null if element type is record type |
| reference_entity_key | number(16) null if element type is record type |
| table constraint uq_composition_1 unique (entity_key, element_key) | |

Each Composition record defines either a record type or a simple field. If a record type, it will have its own entry in the Entities table, and its own set of fields in the Composition table. Also, if a record type, columns of the Composition table that apply to field types will have no values. The primary_key_yn field indicates whether the user has selected the current field to serve as the unique identifier of the record type. The unique_yn field when set to 'Y' identifies the (non-primary key) field to have unique values. If the current element is a foreign key, the reference_element_key points to the referenced element of the entity identified in reference_entity_key. All entities have their own system-supplied surrogate unique key field, whose values are generated from an internal sequence. The surrogate key functions as the unique record identifier when no primary key is defined for the entity. Other fields may be added to enrich the application model, for example, fields relating to ownership, creation, modification, access, security, and display. Security and data integrity policy fields may be added that point to program code that implements security and data integrity policies that relate specifically to the element as it occurs with the entity. The program code is invoked as part of data manipulation activities. A useful field is field_order, which specifies the order of a field in relation to the other fields of an entity, for use during display. Each Entity has by default a surrogate key field, whose values come from a system generated numeric sequence.

The Occurrences table is defined minimally as follows:

| OCCURRENCES | |
|---|---|
| occurrence_key | number constraint pk_occurrences primary key |
| entity_key | number constraint fk_occurrences_1 reference Entities |
| unique_identifier_value | varchar2 (255) not null |
| table constraint uq_occurrences_1 unique (entity_key, unique_identifier_value) | |

The Occurrences table contains information that uniquely identifies specific occurrences of an instance of a record type. Occurrences of the same record type are distinguished by the value of the unique_identifier_value field. This value is typically the value of the primary key field as identified in the Composition table. If there is no designated primary key field, the value of the internal surrogate key field is used as the unique_identifier_value. Other fields may be added to enrich the application model, for example, fields relating to ownership, creation, modification, access, security, and display. Security and data integrity policy fields may be added that point to program code that implements security and data integrity policies that relate specifically to the occurrence defined. The program code is invoked as part of data manipulation activities.

The Data Values tables is defined as follows:

| DATA_VALUES | |
|---|---|
| data_value_key | number constraint pk_data_values_1 primary key |
| occurrence_key | number constraint fk_data_values_1 reference Occurrences |
| composition_key | number constraint fk_data_values_2 reference Composition |
| data_value | varchar2 (255) |

Each row in the Data Values table contains the data value for a field of an occurrence of a record type. The occurrence_key relates the row to a unique record in the Occurrences table, and the composition_key relates the row to a unique row in the Composition table. Given these two key values, information in the structural tables that are related to the field and the entity to which the field belongs can be recovered. Other fields may be added to enrich the application model, for example, fields relating to ownership, creation, modification, access, security, and display. For example, security and data integrity policy fields may be added that point to program code that implements security and data integrity policies that relate generally to the field value, such program code to be invoked as part of data manipulation activities.

2. Record Entry and Storage

Steps in the entry of an occurrence of a record type:
1. Get the entity profile. An entity's profile includes information about the entity from the structural tables.
2. Get the profile of each field of the entity. A field profile includes information about the field from the structural tables.

3. Display the data entry screen.
4. As data is entered, it is checked based on the access, integrity, and referential constraints defined for the field
5. A record is created in the Occurrences table that identifies this unique occurrence of the record.
6. For each data field of the entity, a record is created in the Data Values table.

This process applies recursively to deal with embedded record types.

3. Record Retrieval

Steps in retrieving an occurrence of a record type:

Assume an Employees record type definition as follows: employees (employee_name, payroll_nbr). To retrieve information about the employee whose payroll number is "567095":

1. Get the element_key of the record type Employee from the Elements table.
2. Using the element_key, get the entity_key from the Entities table.
3. Using the entity_key, get the element_key of the primary key of the entity from the Composition table.
4. Using the entity_key and the payroll number "567095", get the occurrence_key from the Occurrences table.
5. Using the occurrence_key, gather all records from the Data Values table whose occurrences_key value is the same as the occurrence_key value in Step 4.
6. Using the composition_key of the retrieved Data Values records, get the corresponding element_key values from the Composition table.
7. Use the element_key values to get information from the Elements table about each field.

4. Addition and Deletion of Tables

Adding the First Data Table

Assume a need to maintain codes (abbreviations) tables. One such table may be a table of countries, thus:

| COUNTRIES | |
|---|---|
| country_name | country_abbr |
| United States | US |
| Canada | CA |
| ... | |

To enter this information into UDSS, first, the elements Countries, country_abbr, and country_name are added to the Elements table, thus:

| ELEMENTS | | | | |
|---|---|---|---|---|
| element_key | element_name | element_type | element_data_type | prompt_text |
| 1 | Countries | R | C | |
| 2 | country_name | F | C | Country Name |
| 3 | country_abbr | F | C | Country Abbreviation | where R = record, F = field, C = character.

The Countries record type is entered into the Entities table:

| ENTITIES | |
|---|---|
| entity_key | version_nbr |
| 1 [Countries] | 1.00 |

(Words in square brackets are annotations for clarity; these annotations are not part of the column values.)

In the Composition table, specify the two elements of the Countries record; country_name and country_abbr.

| COMPOSITION | | | | |
|---|---|---|---|---|
| composition_key | entity_key | element_key | primary_key_yn | unique_yn |
| 1 | 1 [Countries] | 2 [country_name] | Y | |
| 2 | 1 [Countries] | 3 [country_abbr] | N | Y |

After entry of the record occurrences for United States and Canada, the Occurrences table will have the following entries:

| OCCURRENCES | | |
|---|---|---|
| occurrence_key | entity_key | unique_identifier_value |
| 1 | 1 [Countries] | Canada |
| 2 | 1 [Countries] | United States |

The Data_Values table will have the following entries:

| DATA_VALUES | | | |
|---|---|---|---|
| data_value_key | occurrence_key | composition_key | data_value |
| 1 | 1 | 1 | Canada |
| 2 | 1 | 2 | CA |
| 3 | 2 | 1 | United States |
| 4 | 2 | 2 | US |

Deleting a Data Table

To delete a table, delete all its instances in the Data_Values, Occurrences, Composition, Entities and Elements tables. If a column of the table to be deleted serves as the reference field of a foreign key, either table deletion is disallowed, or, if allowed, the foreign key constraint is disabled.

Adding Another Data Table

Adding a data table merely involves entering definitions with no physical restructuring of the database.

Assume a requirement to add to the codes table a table of the states of the United States, with two fields: state_name and state_abbr, and with state_name as the primary key, thus

| US_STATES | |
|---|---|
| state_name | state_abbr |
| California | CA |
| Hawaii | HI |

First, enter in the Elements table the definition of the elements US_States, state_name, and state_abbr;

| ELEMENTS | | | | |
|---|---|---|---|---|
| Element_Key | element_name | element_type | element_data_type | prompt_text |
| 1 | Countries | R | C | |
| 2 | country_name | F | C | Country Name |
| 3 | country_abbr | F | C | Country Abbreviation |
| 4 | US_States | R | C | |
| 5 | state_name | F | C | State Name |
| 6 | state_abbr | F | C | State Abbreviation |

Enter the US_States record type in the Entities table:

| ENTITIES | |
|---|---|
| Entity_key | version_nbr |
| 1 [Countries] | 1.00 |
| 2 [Us_States] | 1.00 |

Enter the composition of US_States in the Composition table:

| COMPOSITION | | | | |
|---|---|---|---|---|
| Composition_Key | entity_key | element_key | primary_key_yn | unique_yn |
| 1 | 1 [Countries] | 2 [country_name] | Y | |
| 2 | 1 [Countries] | 3 [country_abbr] | N | Y |
| 3 | 2 [US_States] | 5 [state_name] | Y | |
| 4 | 2 [US_States] | 6 [state_abbr] | N | Y |

After entry of the occurrences California and Hawaii, the Occurrences table will now have the following entries:

| OCCURRENCES | | |
|---|---|---|
| occurrences_key | entity_key | unique_identifier_value |
| 1 | 1 | Canada |
| 2 | 1 | United States |
| 3 | 2 | California |
| 4 | 2 | Hawaii |

The Data_Values table will have the following entries:

| DATA_VALUES | | | |
|---|---|---|---|
| Data_value_Key | occurrence_key | composition_key | data_value |
| 1 | 1 | 1 | Canada |
| 2 | 1 | 2 | CA |
| 3 | 2 | 1 | United States |
| 4 | 2 | 2 | US |
| 5 | 3 | 3 | California |
| 6 | 3 | 4 | CA |
| 7 | 4 | 3 | Hawaii |
| 8 | 4 | 4 | HI |

5. Adding and Deleting Field Elements

Adding a Field Element and Adding the Field to a Data Table

Assume it is required to add a Population column to the Countries entity to store population figures. The Population column will be added as a field element in the Elements table.

| ELEMENTS | | | | |
|---|---|---|---|---|
| Element_Key | element_name | element_type | element_data_type | prompt_text |
| 1 | Countries | R | C | |
| 2 | country_name | F | C | Country Name |
| 3 | country_abbr | F | C | Country Abbreviation |
| 4 | US_States | R | C | |
| 5 | state_name | F | C | State Name |
| 6 | state abbr | F | C | State Abbreviation |
| 7 | population | F | N(= number) | Population |

The Entities table is unaffected, since no new Entity is being added. The Composition table will have an additional entry indicating that the element Population is a field of the record Countries, thus:

| COMPOSITION | | | | |
|---|---|---|---|---|
| Composition_Key | entity_key | element_key | primary_key_yn | unique_yn |
| 1 | 1 [Countries] | 2 [country_name] | Y | |
| 2 | 1 (Countries) | 3 [country_abbr] | N | Y |
| 3 | 2 [US_States] | 5 [state_name] | Y | |
| 4 | 2 [US_States] | 6 [state_abbr] | N | Y |
| 5 | 1 [Countries] | 7 [population] | N | N |

The Occurrences table is unaffected. The Data_Values table will have additional entries, one for the population of Canada and another for the population of the United States, thus:

| DATA_VALUES | | | |
|---|---|---|---|
| Data_value_Key | occurrence_key | composition_key | data_value |
| 1 | 1 | 1 | Canada |
| 2 | 1 | 2 | CA |
| 3 | 2 | 1 | United States |
| 4 | 2 | 2 | US |
| 5 | 3 | 3 | California |
| 6 | 3 | 4 | CA |
| 7 | 4 | 3 | Hawaii |
| 8 | 4 | 4 | HI |
| 9 | 1 | 5 | 30,000,000 |
| 10 | 2 | 5 | 250,000,000 |

Adding a Column with a Unique Constraint

When adding a column with a unique constraint, the unique_yn field will be marked 'Y'. At runtime during data entry, a function will check the uniqueness of the entered value.

Adding a Foreign Key Column

When adding a foreign key column, the referenced_element_key and the referenced_entity_key must exist and the referenced element must be unique. At runtime during data entry, a function will check existence of the entered value in the appropriate entity instances.

Adding a Column that is Part of a Multi-Field Uniqueness Constraint

If the column being added is to be a part of a multi-column uniqueness constraint, after addition of the column, a procedure will update the tables list of multi-field uniqueness constraints.

If the table already has a primary key, no other column can be marked as the primary key.

Deleting a Field Element

A field element may be detached from a table but still remains in the system, or it may be deleted altogether from the system. To delete from the system a field element that does not participate in any constraint, delete all its occurrences in the Data_Values, Composition, and Elements tables. A field element that participates in table constraints require special steps.

Deleting the Primay Key Column

Deleting a primary key column will remove column values that uniquely identify occurrences of a record type. To proceed, first replace the primary key values in the unique_identifier_value field of the Occurrences table with the corresponding surrogate key values. Then delete occurrences of the field in the Data_Values table, as identified by its element_key and the occurrence_key values.

Deleting a Column Referenced by a Foreign Key

Deleting a column that is referenced by a foreign key also requires the removal of the foreign key constraint in the referencing table.

Deleting a Column that Forms Part of a Multi-column Uniqueness Constraint

If the column to be deleted is part of a multi-column uniqueness constraint, the column is removed from the appropriate "constraint . . . unique detail" phrase of the table. If such a deletion will leave the multi-column uniqueness constraint with only one column, the multi-column column constraint will be converted to a single-column uniqueness constraint.

Although the invention has been described with a certain degree of particularity, it should be recognized that elements thereof may be altered by persons skilled in the art without departing from the spirit and scope of the invention. The invention is limited only by the following claims and their equivalent.

What is claimed is:

1. A system and method for creating and organizing a database used for storing the metadata of an arbitrary number of arbitrarily designs logical data models and for storing the data values of the databases corresponding to said data models, said system and method comprising the steps of:

creating an Elements table for storing a catalog of metadata of simple and complex element types, said table furthermore storing attributes that specify properties of said elements and whose values enrich the information about the elements and control or enrich the behavior of the elements, said attributes including, but not limited to, attributes that support security and data integrity policies, said attributes being invoked during data manipulation activities to control or enrich the behavior of the applications using said table;

creating an Entities table directly related to the aforementioned Elements table for storing metadata associated with instances of complex element types, said table furthermore containing attributes that specify properties of the complex element types therein identified, said attributes containing values that enrich the information about the elements and control or enrich the behavior of the elements, said attributes including, but not limited to, attributes that support security and data integrity policies, said attributes being invoked during data manipulation activities to control or enrich the behavior of the applications using said table, and said Entities table being optional for databases where the complex element types each has only a single definition or instance;

creating a Composition table directly related to the aforementioned Elements and Entities tables for storing metadata associated with the composition of complex element types, said composition consisting of a plurality of elements as defined in the Elements table, said elements being either simple or complex, said elements containing attributes that specify properties of the complex elements and whose values enrich the information about the elements and control or enrich the behavior of the elements, said attributes including, but not limited to, attributes that support security and data integrity policies said attributes being invoked during data manipulation activities to control or enrich the behavior of the applications using said table, said complex element types each having its own entry in the Entities table and element composition definition in the Composition table;

creating an Occurrences table directly related to the aforementioned Entities table for storing data that differentiate specific occurrences of specific instances of complex elements, and storing furthermore metadata associated with specific occurrences of specific instances of complex elements, said table furthermore containing attributes that specify properties of the complex element type therein identified, said attributes containing values that enrich the information about the elements and control or enrich the behavior of the elements, said attributes including, but not limited to, attributes that support security and data integrity policies, said attributes being invoked during data manipulation activities to control or enrich the behavior of the applications using said table; and creating a Data Values table directly related to the aforementioned Occurrences and Composition tables for storing the data values of simple elements associated with occurrences of instances of complex elements, and furthermore storing metadata whose values enrich the information about said simple elements and control or enrich the behavior of said simple elements, including, but not limited to, attributes that support security and data integrity policies, said attributes being invoked during data manipulation activities to control or enrich the behavior of the applications using said table.

2. A computer program product, comprising a computer useable medium having computer program logic stored therein for enabling a computer to store and retrieve data associated with the implementation of an arbitrary number of arbitrarily designed relational data models ink one relational database consisting of five physical tables, wherein said computer program logic includes a relational database organization comprising:

an Elements table for storing metadata comprising the in implementations of an arbitrary number of arbitrarily designed relational data models, said metadata belonging to either simple or complex element types, said table furthermore storing attributes that specify properties of said elements and whose values enrich the information about the elements and control or enrich the behavior of the elements, said attributes including, but not limited to, attributes that support security and data integrity policies, said attributes being invoked during data manipulation activities to control or enrich the behavior of the applications using said table;

an Entities table directly related to the aforementioned Elements table for storing metadata comprising the implementations of an arbitrary number of arbitrarily designed relational data models, said metadata associated with instances of complex element types, said table furthermore containing attributes that specify properties of the complex element types therein identified, said attributes containing values that enrich the information about the elements and control or enrich the behavior of the elements, said attributes including, but not limited to, attributes that support security and data integrity policies, said attributes being invoked during data manipulation activities to control or enrich the behavior of the applications using said table, and said Entities table being optional for databases where the complex element types each has only a single definition or instance;

a Composition table directly related to the aforementioned Elements and Entities tables for storing metadata comprising the implementations of an arbitrary number of arbitrarily designed relational data models, for storing metadata associated with the composition of instances of complex elements identified in the aforementioned Entities table, said composition consisting of a plurality of elements as defined in the Elements table, said elements being either simple or complex, said elements containing attributes that specify properties of the complex elements and whose values enrich the information about the elements and control or enrich the behavior of the elements, said attributes including, but not limited to, attributes that support security and data integrity policies, said attributes being invoked during data manipulation activities to control or enrich the behavior of the applications using said table, said complex element types each having its own entry in the Entities table and element composition definition in the Composition table;

an Occurrences table directly related to the aforementioned Entities table for storing data that differentiate specific occurrences of specific instances of complex elements, and storing furthermore metadata associated with specific occurrences of specific instances of complex elements, said table furthermore containing attributes that specify properties of the complex element type therein identified, said attributes containing values that enrich the information about the elements and control or enrich the behavior of the elements, said attributes including, but not limited to, attributes that support security and data integrity policies, said attributes being invoked during data manipulation activities to control or enrich the behavior of the applications using said table; and a Data Values table directly related to the aforementioned Composition and Occurrences tables comprising the implementations of an arbitrary number of arbitrarily designed relational data models, for storing data values associated with occurrences of instances of complex elements, and furthermore storing metadata whose values enrich the information about said simple elements and control or enrich the behavior of said simple elements, including, but not limited to, attributes that support security and data integrity policies, said attributes being invoked during data manipulation activities to control or enrich the behavior of the applications using said table.

3. A method for using a database, for storing and accessing metadata associated with the implementations of an arbitrary number of arbitrarily designed logical data models and for storing and accessing data values associated with the occurrences of instances of complex elements associated with said implementations, said database being constructed by a method comprising the steps of:

creating an Elements table for storing a catalog of metadata of simple and complex element types, said table furthermore storing attributes that specify properties of said elements and whose values enrich the information about the elements and control or enrich the behavior of the elements, said attributes including, but not limited to, attributes that support security and data integrity policies, said attributes being invoked during data manipulation activities to control or enrich the behavior of the applications using said table;

creating an Entities table directly related to the aforementioned Elements table for storing metadata associated with instances of complex element types, said table furthermore containing attributes that specify properties of the complex element types therein identified, said attributes containing values that enrich the information about the elements and control or enrich the behavior of the elements, said attributes including, but not limited to, attributes that support security and data integrity policies, said attributes being invoked during data manipulation activities to control or enrich the behavior of the applications using said table, and said Entities table being optional for databases where the complex element types each has only a single definition or instance;

creating a Composition table directly related to the aforementioned Elements and Entities tables for storing metadata associated with the composition of complex element types, said composition consisting of a plurality of elements as defined in the Elements table, said elements being either simple or complex, said elements containing attributes that specify properties of the complex elements and whose values enrich the information about the elements and control or enrich the behavior of the elements, said attributes including, but not limited to, attributes that support security and data integrity policies said attributes being invoked during data manipulation activities to control or enrich the behavior of the applications using said table, said complex element types each having its own entry in the Entities table and element composition definition in the Composition table;

creating an Occurrences table directly related to the aforementioned Entities table for storing data that differentiate specific occurrences of specific instances of complex elements, and storing furthermore metadata associated with specific occurrences of specific instances of complex elements, said table furthermore containing attributes that specify properties of de complex element type therein identified, said attributes containing values that enrich the information about the elements and control or enrich the behavior of the elements, said attributes including, but not limited to, attributes that support security and data integrity policies, said attributes being invoked during data manipulation activities to control or enrich the behavior of the applications using said table; and creating a Data Values table directly related to the aforementioned Occurrences and Composition tables for storing the data values of simple elements associated with occurrences of instances of complex elements, and furthermore storing metadata whose values enrich the information about said simple elements and control or enrich the behavior of said simple elements, including, but not limited to, attributes that support security and data integrity policies, said attributes being invoked during data manipulation activities to control or enrich the behavior of the applications using said table.

\* \* \* \* \*